(12) United States Patent
Hansen

(10) Patent No.: US 12,451,215 B2
(45) Date of Patent: Oct. 21, 2025

(54) METHOD FOR IDENTIFYING A CANDIDATE, NAMELY A GENE LOCATION AND/OR A SEQUENCE VARIANT, INDICATIVE FOR AT LEAST ONE (PHENOTYPIC) TRAIT

(71) Applicant: KWS SAAT SE & Co. KGaA, Einbeck (DE)

(72) Inventor: Bjoern Oest Hansen, Leipzig (DE)

(73) Assignee: KWS SAAT SE & Co. KGaA, Einbeck (DE)

( * ) Notice: Subject to any disclaimer, the term of this patent is extended or adjusted under 35 U.S.C. 154(b) by 0 days.

(21) Appl. No.: 18/600,357

(22) Filed: Mar. 8, 2024

(65) Prior Publication Data
US 2024/0304278 A1 Sep. 12, 2024

(30) Foreign Application Priority Data
Mar. 9, 2023 (DE) .......................... 102023105888.6

(51) Int. Cl.
*G16B 20/00* (2019.01)
*G16B 40/20* (2019.01)

(52) U.S. Cl.
CPC ............. *G16B 20/00* (2019.02); *G16B 40/20* (2019.02)

(58) Field of Classification Search
None
See application file for complete search history.

(56) References Cited

U.S. PATENT DOCUMENTS

| | | | |
|---|---|---|---|
| 5,437,697 | A | 8/1995 | Sebastian et al. |
| 8,170,805 | B2 | 5/2012 | Kishore et al. |

(Continued)

FOREIGN PATENT DOCUMENTS

| | | |
|---|---|---|
| DE | 10203627 A1 | 7/2003 |
| DE | 69839350 T2 | 6/2009 |

(Continued)

OTHER PUBLICATIONS

Office Action received for German Application No. 102023105888.6, mailed on Nov. 18, 2024, 11 pages. (Original Copy only).

(Continued)

*Primary Examiner* — Eliyah S. Harper
(74) *Attorney, Agent, or Firm* — ArentFox Schiff LLP

(57) ABSTRACT

The present application is directed to a method for identifying at least one candidate (Loc), namely a gene location and/or a sequence variant, indicative for at least one selected (phenotypic) trait of an organism, in particular of a plant, comprising the steps of:
a. receiving a plurality of candidate lists (Can1, Can2, Can3) of candidates (Loc), the candidate lists being ordered;
b. receiving a reference set (RefDB) with gene locations and/or sequence variants;
c. matching at least a subset of candidates (Loc) from the candidate lists (Can1, Can2, Can3) with the reference list (RefDB) to determine an evaluation value (EV) for at least the subset;
d. assigning each evaluation value (EV) to the respective candidate (Loc) in the respective candidate lists (Can1, Can2, Can3);
e. calculating for each candidate list a performance value based on the evaluation value (EV), in particular by using the evaluation values (EV);
f. selecting at least one candidate (Loc) as (preferred) candidate (Loc) from one of the candidate lists (Can1, Can2, Can3) using the performance values.

14 Claims, 5 Drawing Sheets

| 1 | loc1 | 2 |
|---|------|---|
| 2 | loc2 | 0 |
| 3 | loc3 | 1 |
| 4 | loc4 | 0,5 |
| 5 | loc5 | 0 |

Can1'

(56) References Cited

U.S. PATENT DOCUMENTS

| | | | |
|---|---|---|---|
| 12,002,546 B2* | 6/2024 | Baute | A01H 6/28 |
| 2003/0032015 A1* | 2/2003 | Toivonen | G16B 20/20 |
| | | | 702/20 |
| 2004/0133358 A1* | 7/2004 | Bryant | G16B 50/10 |
| | | | 702/19 |
| 2005/0250098 A1* | 11/2005 | Toivonen | G16B 20/00 |
| | | | 702/20 |
| 2005/0272086 A1* | 12/2005 | Patil | G16B 30/00 |
| | | | 435/6.11 |
| 2006/0257888 A1* | 11/2006 | Zabeau | G16B 30/00 |
| | | | 435/6.14 |
| 2009/0183268 A1* | 7/2009 | Kingsmore | C12Q 1/6883 |
| | | | 514/4.8 |
| 2009/0239214 A1* | 9/2009 | Dai | G01N 33/57415 |
| | | | 702/19 |
| 2009/0307179 A1* | 12/2009 | Colby | G16H 10/40 |
| | | | 706/54 |
| 2015/0337388 A1* | 11/2015 | Garner, Jr. | G16B 35/00 |
| | | | 506/8 |
| 2017/0213127 A1* | 7/2017 | Duncan | G16B 50/30 |
| 2019/0017063 A1* | 1/2019 | Mitchell | A23K 10/30 |
| 2019/0082612 A1* | 3/2019 | Bitetti | A01G 7/045 |
| 2020/0294620 A1* | 9/2020 | Bauer | G06V 20/188 |
| 2020/0379958 A1* | 12/2020 | Riggs | G06F 16/2358 |
| 2021/0269887 A1* | 9/2021 | Mao | C12Q 1/686 |
| 2022/0020449 A1* | 1/2022 | Wagner | G16B 20/20 |
| 2023/0108784 A1* | 4/2023 | Zhang | C12N 15/86 |
| | | | 514/44 R |
| 2023/0317205 A1* | 10/2023 | Lafayette | G16B 20/00 |
| | | | 702/19 |
| 2023/0343413 A1* | 10/2023 | Hamp | G16H 50/70 |
| 2024/0304278 A1* | 9/2024 | Hansen | G16B 40/00 |

FOREIGN PATENT DOCUMENTS

| | | |
|---|---|---|
| DE | 102013221906 A1 | 5/2014 |
| WO | 2010/091248 A1 | 8/2010 |
| WO | 2015/032494 A2 | 3/2015 |
| WO | 2015/032494 A3 | 3/2015 |
| WO | 2015/103430 A1 | 7/2015 |
| WO | 2019/138244 A1 | 7/2019 |

OTHER PUBLICATIONS

Navarro et al., "Diversity of Expression Types of Ht Genes Conferring Resistance in Maize to Exserohilum turcicum", Frontiers in Plant Science, Dec. 2020, 11 pages.

Search Report and Written Opinion received for NL Patent Application No. 2037144, mailed on Jul. 31, 2024, 7 pages (2 pages of English Translation and 5 pages of Original Document).

Welz et al., "Genes for resistance to northern corn leaf blight in diverse maize populations", Plant Breeding, vol. 119, No. 1, Mar. 2000, pp. 1-14.

* cited by examiner

Fig. 3
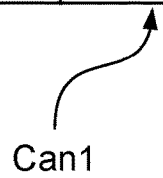
Can1
Fig. 4
Can2
Fig. 5
| Loc | Remark |
|---|---|
| loc1 | Literature |
| loc3 | manual selection |
| loc4 | coexpression with known |
| loc6 | present in QTL |
| loc7 | Literature |
— RefDB
Fig. 6
| Loc | Remark | EV |
|---|---|---|
| loc1 | Literature | 2 |
| loc3 | manual selection | 1 |
| loc4 | coexpression with known | 0,5 |
| loc6 | present in QTL | 1 |
| loc7 | Literature | 2 |
— RefDB Can1'

Can2'

METHOD FOR IDENTIFYING A CANDIDATE, NAMELY A GENE LOCATION AND/OR A SEQUENCE VARIANT, INDICATIVE FOR AT LEAST ONE (PHENOTYPIC) TRAIT

CROSS-REFERENCE TO RELATED APPLICATION

This application claims the benefit of German Patent Application No. 102023105888.6 filed Mar. 9, 2023, the entire contents of which is incorporated herein by reference.

BACKGROUND

The invention relates to a method for identifying a gene location and/or a sequence variant indicative for at least one (phenotypic) trait of interest in an organism, such as a plant, in particular for improving plant architecture, flowering time, senescence, nutrient use, photosynthesis or increasing the resistance to biotic or abiotic stress.

A correlation between plant DNA and their phenotype or set of traits, is an imperative of modern plant breeding. Crop traits can be improved by increased ectopic expression of a trait gene. As an example, Sun et al., 2017 (Nature comm., doi:10.1038/ncomms14752) reported that increased expression of maize PLASTOCHRON1 enhances biomass and seed yield. As one illustrative example, a resistance against "Northern Corn Leaf Blight" (NCLB) caused by the fungus *Helminthosporium turcicum* can be inherited through individual, mostly dominant genes at loci like HT1, HT2, HT3, Htm1 or HTN1 (Lipps et al., 1997, "Interaction of Ht and partial resistance to *Exserohilum turcicum* in maize." Plant Disease 81: 277-282: Welz & Geiger, 2000, "Genes for resistance to northern corn leaf blight in diverse maize populations." Plant Breeding 119: 1-14). Further, WO2015/032494 discloses the identification of the causative gene, RLK1, conferring the "Pepitilla" resistance phenotype in corn and describes molecular markers which are suitable to benefit from this resistance locus without close-linked, undesired linkage drag leading to a negative impact on the yield potential.

Similar to fungal resistances, insect resistance traits bare the potential of reducing feeding damages and thus potentially reducing the use of insecticides in the fields. The insect green peach aphid (*Myzus persicae*) is distributed worldwide and can cause significant yield reduction through direct feeding damage and virus transmission (e.g., turnip yellow virus). They also excrete honeydew during feeding, which eventually sticks to the crop and provides an ideal environment for fungi, such as sooty moulds, to develop. Winged aphids can infect a crop starting from emergence at least until October. Up to now, aphids can only be effectively controlled by selected insecticides. However, the use of insecticides is part of political debates and is getting more and more restricted due to environmental considerations. Above that resistance to insecticides like pyrethroids and pirimicarb are widespread in Europe, the only viable alternative is Pymetrozine for which the timing of the treatment is crucial. New plant protection strategies identifying genes mediating resistance are thus imperative.

In recent years, rapid advances in next-generation sequencing (NGS) have enabled targeted genotyping-by-sequencing (GBS) and whole-genome-sequencing (WGS) to become cheaper, more accurate and widely available. Compared to genotyping arrays, GBS and WGS have several advantages including the ability to detect de novo variant positions, the ability to detect multi-allelic variant positions, the versatility of the array across genetic material of many different origins, and the technical simplicity of the experimental design (no chip-design).

Conventional PCR amplicon-based sequencing techniques are restricted to relatively short target lengths compatible with amplification and do not perform well in genomic regions with a repetitive nature or high GC content. Using a CRISPR/Cas-based targeted sequencing approach, it is possible to achieve a significant increase in coverage of the targeted genomic region and an improved robustness against repetitive structures because amplification is not necessary. Coupled with a long-read sequencing technology such as Oxford Nanopore Technologies (ONT) nanopore sequencing, Cas-targeted sequencing allows e.g., for the analysis of extremely large target regions and can even support the identification of epigenetic modifications.

The use of CRISPR-Cas nucleases for targeted sequencing based on an enrichment of a region of interest surrounded by known sequences has been described already, e.g., by Oxford Nanopore Technologies in their "Cas9 targeted sequencing" protocol (Version: ENR_9084_v109_revP_4dec.2018) or in the nCATS (nanopore Cas9-targeted sequencing) method by Gilpatrick et al. (Gilpatrick, T., Lee, I., Graham, J. E. et al. Targeted nanopore sequencing with Cas9-guided adapter ligation. Nat Biotechnol 38, 433-438 (2020). https://doi.org/10.1038/s41587-020-0407-5). These methods describe the CRISPR-Cas9 enrichment of regions of interest using pairs of guide RNAs that face each other, which leads to sequencing of the region in between the two guide RNAs. This strategy is similar to PCR amplicon-based sequencing techniques which rely on a PCR reaction using PCR primers that need to be oriented towards each other. It allows for targeted sequencing of regions that are surrounded by known sequences that are required for the design of the guide RNAs.

The use of an adapter-based sequencing approach such as nanopore sequencing allows obtaining long reads and speeding up sequence analysis. The obtained long-read sequencing data is less ambiguous than the sequencing data obtained by other, in particular undirected, sequencing approaches which typically generate shorter reads.

In particular, due to recent progress in sequencing technology, which have resulted in a significant reduction in price and increase in speed, huge quantities of data are available.

However, the larger the dataset become, the more exists a need to develop a method to efficiently process these increasing datasets and to provide an efficient identification process of at least one candidate, namely a gene location and/or a sequence variant indicative for a particular (phenotypic) trait.

BRIEF DESCRIPTION

It is thus an objective of the present invention to identify and/or further characterize resistance genes, gene locations, and/or sequence variants in an organism, in particular in a plant, e.g., gene loci, and/or sequence variants conferring a particular trait such as increasing resistance against pathogens. More generally, it is an objective of the present invention to identify at least one candidate, namely a gene location and/or a sequence variant linked to a select (phenotypic) trait improving plant architecture, flowering time, senescence, nutrient use, photosynthesis or increasing the resistance to biotic or abiotic stress. This may also include resistance or tolerance to drought stress, osmotic stress, heat stress, cold stress, oxidative stress, heavy metal stress, nitrogen deficiency, phosphate deficiency, salt stress or waterlogging, herbicide resistance, including resistance to glyphosate, glufosinate/phosphinotricin, hygromycin, resistance or tolerance to 2,4-D, protoporphyrinogen oxidase (PPO) inhibitors, ALS inhibitors, and Dicamba, a nucleic acid molecule encoding resistance or tolerance to biotic stress, including a viral resistance gene, a fungal resistance gene, a bacterial resistance gene, an insect resistance gene, or a nucleic acid molecule encoding a yield related trait, including lodging resistance, flowering time, shattering resistance, seed color, endosperm composition, or nutritional content.

It has been noted that known methods of identifying respective gene locations and/or sequence variants, particularly the process of verifying whether modification at particular gene locations and/or sequence variants result in a particular trait without negatively effecting other traits, take a long time.

Also, existing studies and analyses have led to many different lists of candidates comprising gene locations and/or sequence variants indicative for a selected trait. Verifying these candidates and their factual improvement is time consuming and requires a significant amount of resources light, water, soil, etc.

In light of this, it is an objective of the present invention to improve the efficiency of the identification process of gene locations and/or sequence variants providing for a particular phenotypic trait.

The problem is solved by a method in accordance with the method of claim 1.

In particular, the problem is solved by a method for identifying at least one candidate, namely a gene location and/or a sequence variant, indicative for at least one selected (phenotypic) trait of an organism, in particular of a plant, comprising the steps of:
 a. receiving a plurality of candidate lists of candidates (Loc), the candidate lists being ordered:
 b. receiving a reference with gene locations and/or sequence variants:
 c. matching at least a subset of the candidate lists with the reference list to determine an evaluation value for at least the subset:
 d. assigning each evaluation value to the respective candidate in the respective candidate lists:
 e. calculating for each candidate list a performance value based on the evaluation value, in particular by using the evaluation values:
 f. selecting at least one candidate as (preferred) candidate from one of the candidate lists using the performance values.

The organism as understood throughout the invention is thereby not particularly limited, but is preferably a plant, in particular a crop plant.

A sequence variant as used herein is a gene or DNA sequence or single nucleotide, preferably with a known location on a chromosome, that can be used to genotype individuals or species. It can be described as a variation (which may arise due to mutation or alteration in the genomic loci) that can be observed in comparison to an individual carrying the wild-type sequence. A gene or sequence variant may be a short DNA sequence, such as a single base-pair change (single nucleotide polymorphism, SNP), or a long one, like minisatellites. As gene or sequence variants might be considered: RFLP (or Restriction fragment length polymorphism), SSLP (or Simple sequence length polymorphism), AFLP (or Amplified fragment length polymorphism), RAPD (or Random amplification of polymorphic DNA), VNTR (or Variable number tandem repeat), SSR Microsatellite polymorphism, (or Simple sequence repeat), SNP (or Single nucleotide polymorphism), STR (or Short tandem repeat), SFP (or Single feature polymorphism), DArT (or Diversity Arrays Technology), RAD markers (or Restriction site associated DNA markers), or a structural genomic variant (SV), including presence-absence variant, copy-number variant (CNV), and/or inversion. According to preferred embodiments, the sequence variant is a single nucleotide polymorphism (SNP), an allele of a gene, or a structural genomic variant (SV), or a combination of two or more different variant types. In accordance with the invention, list of sequence variants and/or gene locations (=locations of candidate genes) may be analyzed and used to select at least one candidate, e.g., for further processing, field tests and other analytic test.

In one embodiment, the method may comprise a step of receiving genomic data of the genome of one or more individuals, preferably to generate the candidate lists and/or the reference set.

The term genomic data or gene data as used herein are broad terms referring to sequenced DNA or RNA that can be in the form of raw data derived from sequencing, an organism's genome in whole or in part (whole assembled genome sequences or whole exome sequences—the genes that encode proteins), or individual DNA or RNA variations. Genomic data (e.g., array data or sequencing data) may or may not have assigned marker variants.

According to some embodiments, the genomic data is received in the form of genomic sequencing data or array data. The genomic data can be received in the form of raw data, i.e., genomic data provided by a sequencing apparatus or an array scanning apparatus: the genomic raw data which may not be annotated.

Without the wish to be bound to any theory, several technologies can provide raw data which might be visualized in a list serving as candidate list in the sense of the method presented herein.

The candidate lists may show differently expressed genes, gene products, metabolites, hormones, mutation rates, DNA duplications, Insertions, SNPs or CNVs. Furthermore, a candidate list may compare traits or phenotypic traits.

According to some embodiments, the genomic data is based on (e.g., is derived from) genomic data of the genomes of one or more individuals, whereby the genomic data is selected from a group comprising:
 Sequencing data of one or more individuals;
 low-depth sequencing data of the individuals:
 ultra-low-depth sequencing data of the individuals:
 deep sequencing data of the individuals;
 ultra-high-depth sequencing data of the individuals:
 DNA array data, in particular SNP array data, of individuals.

Embodiments of the invention may be applied on array-based and/or deep sequencing based genomic data. In one embodiment, the necessary steps for generating the array-based and/or deep sequencing based genomic data may be part of the claimed method. Likewise, embodiments of the invention may be applied on cheap low-quality/low coverage genomic data and provide similar results in terms of feature prediction accuracy or performance. Hence, the same approach can flexibly be used for performing the computation both for low-depth and for high-depth genomic data.

Embodiments of the invention may be applied on data resulting from high-throughput proteomic technologies such as (m)RNA or protein microarrays, protein sequencing, or whole transcriptome sequencing. These technologies may provide for a plurality of candidate lists according to some embodiments. In this context a sequence variant comprises amino acid sequence variants and traits may encompass protein translation or expression levels.

According to embodiments, the receiving of data can comprise reading the data from a remote or local data storage medium, e.g., a cloud storage, or receiving the data from a remote computer system via a network. Likewise, the data can be received via an interface of a sequencing apparatus or via an interface of a DNA array reading device. In some embodiments, some sequence variants or gene locations may even be annotated manually by a user.

In one embodiment, candidate lists are generated by mapping data from sequencing machines, e.g., as discussed in the introduction, to a reference genome or assembled to a transcriptome. This can be done for samples from multiple individuals, tissues, developmental stages or conditions.

This mapped dataset could e.g., be compared by using tools known to the art such as DESeq2, to identify genes that are significantly changing in their abundance/expression level from one sample to the other. These genes can then be ordered by the amount of change from one sample to the other. Usually in the form of log 2 fold change. The ordered lists can be used as input for the inventive method, e.g., as candidate lists, whereby the expression results are ranked. To evaluate the performance of these rankings and generate the weights, genes with evidence towards the trait of interest are integrated as described herein.

The method requires that a plurality of candidate lists is available. The respective lists need to be ordered. This can mean that they are arranged in different positions indicating a higher or lower rank. Alternatively, other data structures can be used like a linked list giving an order to each element within the list.

One example of (ordered) candidate lists could be differentially expressed genes. Differentially expressed genes are genes that show significantly different levels of expression between two or more biological conditions, such as different tissue types, stages of development or healthy and diseased, treated vs untreated, mutant vs. wildtype.

To arrive at an ordered candidate list, expression levels of a gene can be measured by the amount of mRNA that is produced from the gene (by using e.g., RNA sequencing data), or by the amount of protein that is produced from the mRNA (by using e.g., proteomics analysis). In one embodiment of the invention, microarray analysis and RNA sequencing are used to measure the expression levels of genes. Such analysis can be performed in parallel and thus will be highly efficient.

The goal of this approach is to identify which genes might change significantly from one sample to the other. For example, investigating the reaction to abiotic stress by comparing a plant treated with drought to a control plant. The regulatory networks will respond differently, and they will express different sets of genes. According to the invention, differentially expressed genes can be used to understand the mechanisms underlying biological processes and to identify genes that may be involved in a certain function, developmental step, or reaction to stimuli. In one embodiment, a gene is declared differentially expressed if a difference observed in expression levels between two samples is statistically significant.

There are several ways to calculate differentially expressed genes, and the specific method used might depend on the type of data, and the statistical analysis that is intended to be performed.

Some embodiments of the invention involve the steps:
1. Collection and preparation of data-raw data from a sequencer e.g., expression data covering the genes to analyze, as well as information about the biological conditions or samples being compared.
2. Normalizing the data—it is often necessary to normalize the expression data to account for differences in the amount of mRNA or protein being measured, for example from differences in library size, or in library composition. Multiple methods exist, when selecting the method, it is important to select an appropriate method for the measurement that was used. Simple methods are for example log transformation, more advanced for RNA-seq is the variance stabilized transformation implemented in the R package DESeq2.
3. Statistical analysis: There are many different statistical methods that can be used to identify differentially expressed genes, for example using a t-test. The methods typically compare the expression levels of the genes being analyzed between the different biological conditions or samples and calculate a p-value or other measure of statistical significance.
4. Correction for Multiple testing: When testing for differential expression of many genes at once, it is important to correct for multiple testing to avoid false positive results. There are several methods for correcting for multiple testing, such as the Bonferroni correction or the false discovery rate (FDR).
5. Select a threshold for differential expression: To identify differentially expressed genes, a threshold for statistical significance is included. This threshold might depend on the statistical method being used and the level of confidence needed. In one embodiment, it is about 0.05 or 0.01.

The result of the above-described steps can be a list of genes with a significant change in expression. This can for example come as a list of genes and their log 2 fold change from one measurement to the other. This can then be used as a candidate list, wherein the candidates are ranked/ordered from highest upregulation to highest downregulation.

In one embodiment, a relative difference between two values is determined on a logarithmic scale, e.g by considering the fold changes. In one embodiment the logarithm to base 2 ("log 2 fold change") is used which is known in the art. For example, if a gene is expressed at a level of 5 units in one condition and at a level of 80 units in another condition, the log 2 fold change would be calculated as log 2(80/5)=4. This indicates that the gene is expressed at a level that is four times higher in the second condition compared to the first.

Since we assume that the genes with the highest change, either positive or negative, haven a biological impact the absolute value can be used when creating at least one of the candidate lists. The quality of the respective candidate lists is determined using a knowledge base in the form of a reference set with gene locations and/or sequence variants. The reference set can be determined by performing independent studies or experiments.

Essentially, the reference set is used to find matching gene locations and/or sequence variants in the candidate lists. In other words, the method requires identifying candidates in the candidate lists based on the reference set. By performing this matching, evaluation values can be assigned to the candidates. In one embodiment, positive evaluation values indicate that the reference set has proven to establish a positive result from modifying the respective gene location and/or sequence variants. Negative values can depict that the respective gene location and/or sequence variants had a negative or neutral impact on the phenotypic trait that is intended to be established.

The evaluation values assigned to the candidates in the candidate list can be used to establish a (numerical) quality indicator for each of the candidate list. In the present application, the quality indicator is referred to as performance value. Once the respective performance value has been established, it is easy to select the most promising candidates-gene locations and/or sequence variants—for establishing a certain phenotypic trade.

By using this approach which matches the reference set with the candidate lists, the most promising candidates can be identified easily. Thereby, the resources which are required for testing/verifying whether particular traits can be established, can be significantly reduced.

The breeding of organisms with particular traits requires less time and effort (soil, labour, water, electricity or light).

In one embodiment, the method comprises the step of at least partially creating the reference set. This can be done by analysis steps:

selecting a plurality of individuals, wherein the plurality of individuals comprises individuals having the selected (phenotypic) trait and individuals not having the selected phenotypic trait:

analysing the plurality of individuals by using DNA and/or RNA sequencing, a genomic analysis, a proteomic analysis, a transcriptomic analysis, and/or a cellomic analysis to obtain an analysis result:

correlating the analysis result, in particular the DNA and/or RNA sequence, to determine a gene location and/or sequence variant of interest to be stored in the reference set.

In one embodiment, a plurality of individuals is selected from a group comprising: individuals with a haploid genome:

individuals with a doubled-haploid genome:
individuals of an inbred species, race or variety:
individuals with a diploid genome; and/or
individuals with a polyploid genome:
wherein the individuals are plants or animals, preferably plants.

In one embodiment, the organism is a plant selected from the group consisting of sugar *Hordeum, Sorghum, Saccharum, Zea, Setaria, Oryza, Triticum, Secale*, Triticale, Malus, Brachypodium, *Aegilops, Daucus, Beta, Eucalyptus, Nicotiana, Solanum, Coffea, Vitis*, Erythrante, Genlisea, *Cucumis, Marus, Arabidopsis, Crucihimalaya, Cardamine, Lepidium, Capsella, Olmarabidopsis, Arabis, Brassica, Eruca, Raphanus, Citrus, Jatropha, Populus, Medicago, Cicer, Cajanus, Phaseolus, Glycine, Gossypium, Astragalus, Lotus, Torenia, Allium*, or *Helianthus*, preferably, the plant or plant cell originates from a species selected from the group consisting of *Hordeum vulgare, Hordeum bulbusom, Sorghum bicolor, Saccharum officinarium, Zea* spp., including *Zea mays, Setaria italica, Oryza minuta, Oryza sativa, Oryza australiensis, Oryza alta, Triticum aestivum, Triticum durum, Secale cereale*, Triticale, *Malus domestica, Brachypodium distachyon, Hordeum marinum, Aegilops tauschii, Daucus* glochidiatus, Beta spp., including *Beta vulgaris, Daucus pusillus, Daucus muricatus, Daucus carota, Eucalyptus grandis, Nicotiana sylvestris, Nicotiana tomentosiformis, Nicotiana tabacum, Nicotiana benthamiana, Solanum lycopersicum, Solanum tuberosum, Coffea canephora, Vitis vinifera*, Erythrante guttata, Genlisea *aurea, Cucumis sativus, Marus notabilis, Arabidopsis arenosa, Arabidopsis lyrata, Arabidopsis thaliana, Crucihimalaya himalaica, Crucihimalaya wallichii, Cardamine nexuosa, Lepidium virginicum, Capsella* bursa *pastoris, Olmarabidopsis pumila, Arabis hirsute, Brassica napus, Brassica oleracea, Brassica rapa, Raphanus sativus, Brassica juncacea, Brassica nigra, Eruca vesicaria* subsp. *sativa, Citrus sinensis, Jatropha curcas, Populus trichocarpa, Medicago truncatula, Cicer yamashitae, Cicer bijugum, Cicer arietinum, Cicer reticulatum, Cicer* judaicum, Cajanus cajanifolius, Cajanus scarabaeoides, *Phaseolus vulgaris, Glycine max, Gossypium* sp., *Astragalus* sinicus, Lotus japonicas, Torenia fournieri, *Allium cepa, Allium fistulosum, Allium sativum, Helianthus annuus, Helianthus tuberosus* and/or *Allium tuberosum*.

In one embodiment, the plant is selected from the list, comprising sugar beet, maize, cereals, rapeseed, sorghum, sunflower, and/or vegetables such as potato, pea, pepper, tomatoes, spinach, and cabbage.

A genomic analysis shall preferably be understood as the identification, measurement or comparison of genomic features such as DNA sequence, structural variation, gene expression, or regulatory and functional element annotation at a genomic scale.

A proteomic analysis shall preferably be understood as the systematic identification and/or quantification of at least a part of the proteins or the complete complement of proteins (the proteome) of a biological system, in particular at a specific point in time.

A transcriptomic analysis shall preferably be understood as the identification, measurement or comparison of the transcriptome, thus the RNA, in particular the mRNA, of a biological system.

A cellomic analysis shall preferably be understood as quantitative and/or qualitative analysis of cells, in particular by using bioimaging methods and informatics.

In a preferred embodiment, the analysis of the plurality of individuals comprises at least partially sequencing the DNA and/or RNA of the plurality of selected individuals.

This sequencing may be limited to certain regions of the genome and/or certain specific RNAs, however, this sequencing may also cover a genome wide sequencing, a whole exon sequencing or the sequencing of the whole transcript (RNA) at any desired resolution level.

Building up the reference set can comprise separating several individuals into different groups based on the question whether or not the selected (phenotypic) trait is present or to which degree the respective (phenotypic) trait can be measured. The genetic material of the grouped individuals can be analysed to determine on a deterministic basis whether a particular gene location and/or sequence variants is of interest for arriving at a certain (phenotypic) trait. The respective information can be stored within the reference set and/or used to establish the evaluation values.

In accordance with the present invention, very few evaluations can be used to establish the performance values.

Establishing evaluation values for selected gene locations and/or sequence variants, i.e., the analysis steps, will improve the accuracy of the performance values. Thereby, a significant amount of resources can be saved.

In one embodiment, step e) comprises generating an ordered evaluation list for each candidate list by giving each evaluation value an order in the ordered evaluation list that corresponds with or relates to the order of the gene location and/or sequence variants that the respective evaluation value is assigned to. In one embodiment, the ordered evaluation list corresponds to the order of the respective candidate lists. Of course, there are other implementation alternatives to the proposed one like assigning the evaluation values to the respective gene locations and/or sequence variant, thereby implicitly generating an order for each evaluation value.

Generally, it is not necessary to assign an evaluation value to each gene location and/or sequence variant of the candidate lists. In one embodiment, gene locations and/or sequence variants which are not contained in the reference list are assigned with a negative value or with a null value, indicating that no indication can be given whether the respective gene location and/or sequence variant is relevant for the analysed aspect e.g., trait.

There are several ways of generating the performance value for a particular list. In one embodiment, the respective method comprises calculating a cumulative gain for each candidate list based on an order of the evaluation values. In one embodiment, the respective order can be provided by the ordered evaluation list as discussed above. In a preferred embodiment, a discounted cumulative gain is calculated. In essence, any function can be used that takes account whether or not positively evaluated gene locations and/or sequence variants of the reference set are contained in the respective candidate list.

In one embodiment, e.g., discounted cumulative gain, the order of the evaluation values is also indicative of the quality of the respective candidate list. In other words, if candidates with a high evaluation value are ranked higher in the respective candidate list than gene locations and/or sequence variants with a lower evaluation value, the quality of the respective list is assessed to be higher. Therefore, a respective better performance value is assigned to the respective list.

The performance value can be a normalized performance value. Therefore, step f) can comprise calculating a normalized performance value for each candidate list. The respective normalization can take place by using a softmax algorithm. The softmax algorithm can comprise a softmax function or any other normalized exponential function which converts the performance values to a value between zero and one, whereby the sum of all of the normalized performance values for the respective candidate lists add up to one.

In one embodiment of the invention, the reference list assigns at least one category to each gene location and/or sequence variant in the reference list. Theoretically, it is also within the scope of the present invention that at least a subset of gene location and/or sequence variant has a category assigned thereto. The respective category can have a cardinality of smaller than 20 or smaller than 10. The categories can indicate that:

a particular gene location and/or sequence variant is present in a QTL;

there is literature evidence for the relevance of a gene and/or sequence variant to a trait of interest experts have selected the respective gene location and/or sequence variant for further analysis;

the gene and/or sequence variant has been co-expressed with known genes; and/or close proximity location to a known gene on the genome.

In the above, the term "known" is used to indicate that a particular gene is, e.g., known from past findings, known to be trait relevant.

Further categories are possible.

The method can comprise:

determining a numerical value for each category;

using the numerical value to determine the evaluation values.

In one embodiment the method comprises:

measuring (aggregated) effects in an individual organism:

updating or adding entries in the reference list based on the measured effect, the entries comprising an indication of a gene location and/or a sequence variant as well as an evaluation value.

The entries in the reference list can be at least partially based on measurements of a selected trait.

In one embodiment, a candidate, namely a gene location and/or a sequence variant determined based on one of the methods above can be used to provide real measurement data and thereby update the reference list. In a further iteration circle, the updated value can be used to better qualify the candidate list and to select a better candidate for a future trial.

The problem as described can also be solved by a method comprising the steps of:

a. identifying a gene location indicative for at least one (phenotypic) trait of an organism in accordance with one of the methods as described above:

b. determining a target sequence variant for the gene location that is likely to be associated with the (phenotypic) trait:

c. selecting an individual of the organism with the determined sequence variant for breeding.

There will be similar positive effects as described above when applying the respective method. The method essentially provides for selecting an individual organism with the sequence variant for further breeding.

Alternatively, the problem can be solved by a method for identifying a target sequence variant associated with a (phenotypic) trait comprising the steps of:

selecting a gene location accordance with the method of one of the preceding embodiments:

determining in an individual a target sequence variant for the gene location that is likely to be associated with a (phenotypic) trait.

In a further embodiment, a method for identifying a target sequence variant associated with a (phenotypic) trait comprising the steps of:

selecting a sequence variation in accordance with the method of one of the preceding embodiments:

determining in an individual comprising that sequence variation that is likely to be associated with a (phenotypic) trait.

In one embodiment, the selection of the individual organism comprises a genomic analysis, a proteomic analysis, a transcriptomic analysis, and/or a cellomic analysis of a plurality of individuals of the organism, in particular as described above.

In one embodiment, the selection of the individual organism comprises sequencing the DNA and/or RNA of a plurality of individual organisms, in particular as described herein. The method can further comprise comparing the target sequence variant with the known sequence variant of an individual organisms at the gene location.

By doing so, the quality of the result can be determined.

In one embodiment, the determining of the target sequence variant can comprise:

selecting a plurality of individuals showing a selected (phenotypic) trait;

sequencing the DNA and/or RNA of the plurality of individuals to obtain genetic information, in particular as described herein;

using the genetic information of the plurality of individuals to determine the target sequence variant associated with said (phenotypic) trait.

The abovementioned problem can also be solved by a computer-readable medium. In particular, by a computer-readable medium comprising instructions, the instructions implementing the method of one of the preceding claims when being executed. In one embodiment, the instructions implement only some of the above-captioned steps, e.g., the steps a) to f).

In one embodiment, the problem is solved by a method for modifying at least one (phenotypic) trait of an organism, in particular of a plant, comprising the steps of:
  a. selecting a first and a second individual organism carrying a trait of interest by applying the method as described herein;
  b. crossing the first and the second selected individual organisms to create an organism with the (phenotypic) trait.

In one embodiment, any combination of one or more computer-readable medium(s) may be utilized. The computer-readable medium may be a computer-readable signal medium or a computer-readable storage medium.

In one embodiment, the problem is solved by a system, preferably a computer system, implementing at least some of the method steps—as far as these can be implemented by a computer and/or respective peripheral devices (e.g., sensors and/or actuators).

For implementing the inventive method on the system computer executable code may be used. Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Preferred embodiments can be derived from the dependent claim.

BRIEF DESCRIPTION OF THE DRAWINGS

In the following, several embodiments of the invention will be described drawing reference to the figures which show:

FIG. 3, 4 tables each representing a candidate list of gene locations:

FIG. 5, 6 tables representing a knowledge base respectively:

In the following, identical reference numerals refer to components having similar functionality.

DETAILED DESCRIPTION

Figure 1:
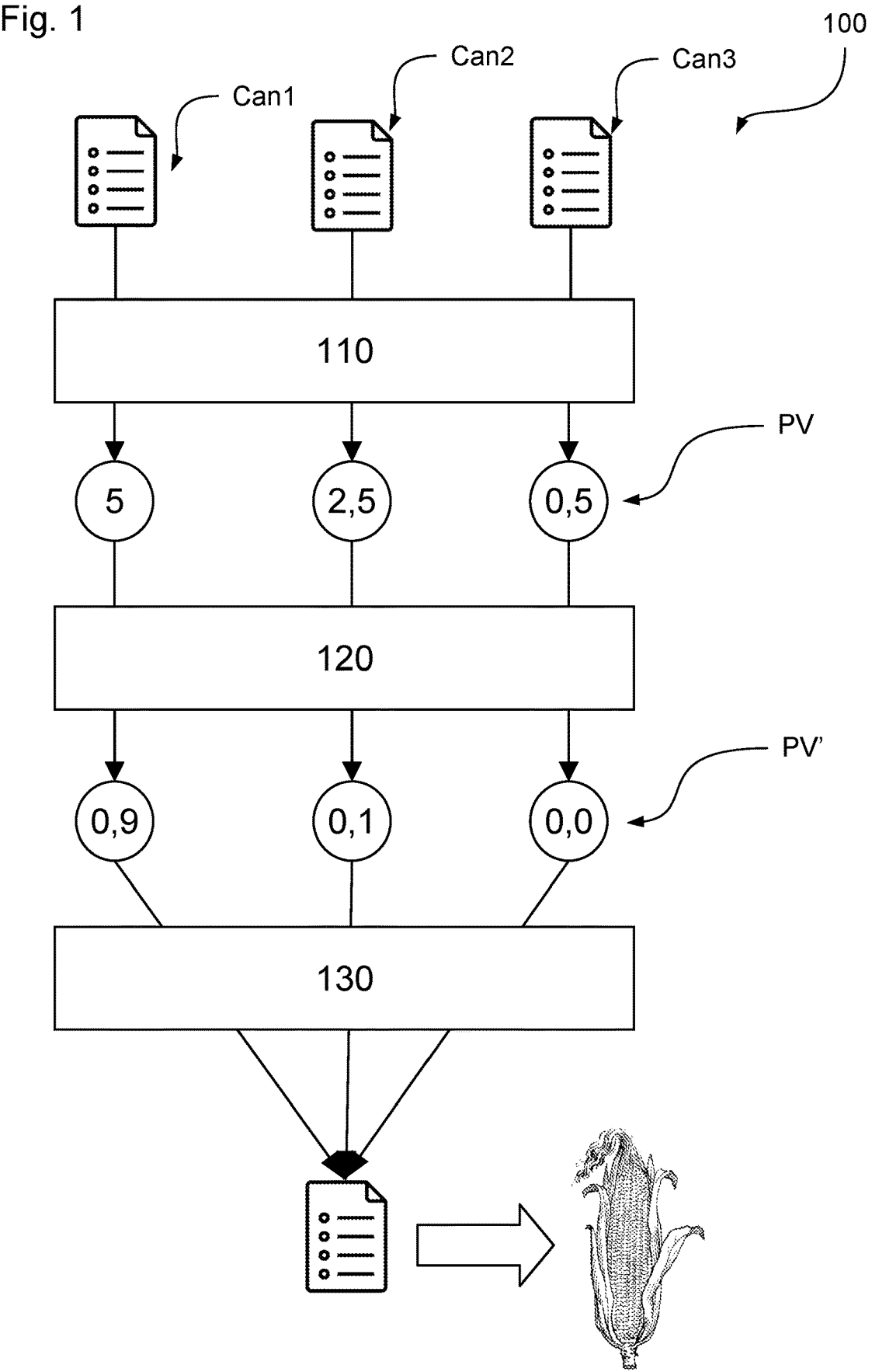
FIG. 1 a process for identifying a gene location candidate indicative for a particular trait.

FIG. 1 illustrates the process of selecting an individual organism based on several candidate lists Can1, Can2, Can3.

Examples of the respective candidate lists Can1, Can2, Can3 are shown in more detail in FIGS. 3, 4, 7, 8. In accordance with the invention, the respective candidate lists Can1, Can2, Can3 are ordered (i.e., FIG. 3 with the ranks 1 to 5). Each of the candidate lists Can1, Can2, Can3 contains a plurality of gene locations. The first candidate list Can1 has in accordance with FIG. 3:
  on its first rank the gene location loc1,
  on its second rank the gene location loc2,
  on its third rank the gene location loc3,
  on its fourth rank the gene location loc4 and
  on its fifth rank the gene location loc5.

The second candidate list Can2 has in accordance with the embodiment as shown in FIG. 4 the ranks 1 to 4 with the gene locations loc1, loc4, loc3, loc2 respectively.

As a first step, the process of FIG. 1 calculates in step 110 performance values PV. For doing so, a knowledge base RefDB is consulted. An exemplary version of such a knowledge base RefDB is shown in FIG. 5. The knowledge base RefDB lists a number of gene locations in the left column ("Loc"), namely loc1, loc3, loc4, loc6 and Loc7. Notably, not all of the locations contained in the plurality of candidate lists Can1, Can2, Can3 are listed in the knowledge base RefDB. Normally, one would expect that only a small subset of gene locations are known from/addressed in the knowledge base RefDB, e.g., less than 30%, in particular less than 20%.

For those gene locations contained in the knowledge base RefDB, there are remarks ("Remark") stating where the respective gene location is known from. The remarks are organized in a small set of categories, e.g., less than 10. The respective categories shown in the left side column are used to generate evaluation values. FIG. 6 shows an extended version of the table representing the knowledge base RefDB. Here, the rightest column is added (heading: "EV") which contains for each gene location Loc an evaluation value assigned thereto. The respective evaluation values EV represent how likely it is that a particular phenotypic trait can be generated by adapting the genetic variation at the respective gene location. Thus, the shown knowledge base RefDB is trait specific. In other implementations, the knowledge base RefDB might contain additional information indicating for which traits the respective information in a row hold. With this implementation, a single knowledge base RefDB can be used for assessing different candidate lists Can1, Can2, Can3 for different traits.

According to the embodiment of FIG. 6, a gene location loc1 known from literature (category="Literature") will receive a high evaluation value EV of 2. If the respective location, e.g., loc4 is a co-expression, a significant lower evaluation value EV of 0.5 is assigned thereto. Of course, it goes without saying that in light of the invention the evaluation values and respective mappings can be changed. The respective values can, for example, be significantly higher or smaller. Also, it is viable to assign other categories to other values, or to change the order of the exemplary categories shown in FIGS. 5 and 6.

Also, it is not necessary to have an extended table as shown in FIG. 6 for assigning the evaluation values EV to certain locations Loc. Alternatively, pointers can be used to implement a respective assignment. Also, the columns with the "Remark" are not necessary. In one embodiment, a simple table showing the locations Loc and the evaluation values EV is used. Also, it is not necessary to save the evaluation values EV in a table and/or database. Alternatively, in-memory data structures can be used to make the respective values available.

Figure 7:
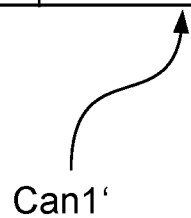
FIG. 7, 8 tables each representing a candidate list of gene locations with evaluation values.
Figure 8:
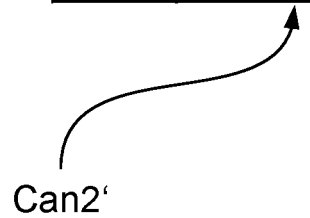

Independent of the tangible implementation of the knowledge base RefDB, the entries thereof are used to assign evaluation values EV to known gene locations contained in the candidate lists Can1, Can2, Can3. Unknown locations contained in the candidate lists Can1, Can2, Can3 can be skipped or assigned with a zero value or any other null value. FIGS. 7 and 8 show an extended candidate list Can1' and Can2' based on the candidate list Can1, Can2, respectively, wherein evaluation values EV have been added based on the entries contained in the knowledge base RefDB.

In step 110, the respective entries can be used to determine the performance value PV. In one embodiment, the evaluation values of a particular candidate list Can1, Can2 or Can3 can be summed up to arrive at a performance value for the respective list. If a simple summing up is used, the performance value of the candidate list Can1' as shown in FIG. 7 would sum up to 3.5. With that approach, the performance value for the candidate list Can2' would be 3.5 as well.

In another (preferred) embodiment, an algorithm is used that takes into consideration the position of the preferred candidates in the respective candidate lists Can1, Can2, Can3. Applying the discount cumulative gain function to the evaluation values EV of FIG. 7 would lead to a performance value PV of about 2.7. Correspondingly, the performance value of the candidate list Can2' would be about 2.8.

After calculating the performance values PV for each candidate list Can1, Can2, Can3 the performance values PV can be normalized in step 120 (FIG. 1). Different algorithms can be applied to arrive at normalized values. In the example as shown in FIG. 1, Softmax is applied to arrive at the normalized value of 0.9 for the first candidate list Can1, 0.1 for the second candidate list Can2, and 0.0 for the third candidate list Can3.

In step 130, the candidate lists Can1, Can2, Can3 can be merged into a single list containing some or all candidates mentioned in the original lists. This merged list is preferably ordered and can then be used to select an individual organism for breeding. Alternatively, step 130 can be omitted such that a selection of the individual organism can already be made based on the performance value and the candidate lists Can1, Can2, Can3. In one embodiment, the candidate list with the best normalized performance value PV' is selected, e.g., in the shown embodiment Can1, and within that candidate list Can1, the highest ranking, potentially unknown candidate is selected for further breeding experiments.

Alternatively, as described the lists can be merged, e.g., via an algorithm as depicted below:

```
candidates {"Can1": {"loc1":1, "loc2":2, "loc3":3,
    "loc4":4, "loc5":5}, "Can2": {"loc1":1, "loc4":2,
    "loc3":3, "loc2":4} }
weights={"Can1":0.9,"Can2":0.1}  #weights obtained
    through step 120
new_candidates=defaultdict(list)
#In this case the ordering is highest=best
for cand in candidates: #Iterate over each candidate list:
    Can1, Can2, etc.
    max=len(candidates[cand]) #Get the length of the
        respective candidate list
    for i in candidates[cand]: #Iterate over each candidate
        in a particular candidate list
        new_rank=max_-candidates[cand][i] #Calculate the
            new rank
        new_candidates[i]. append(new_rank*(weights
            [cand])) #Multiply it with the weight
for i in new_candidates:
    print(i, sum(new_candidates[i])) #the sum of the new
        ranks
```

Figure 2:
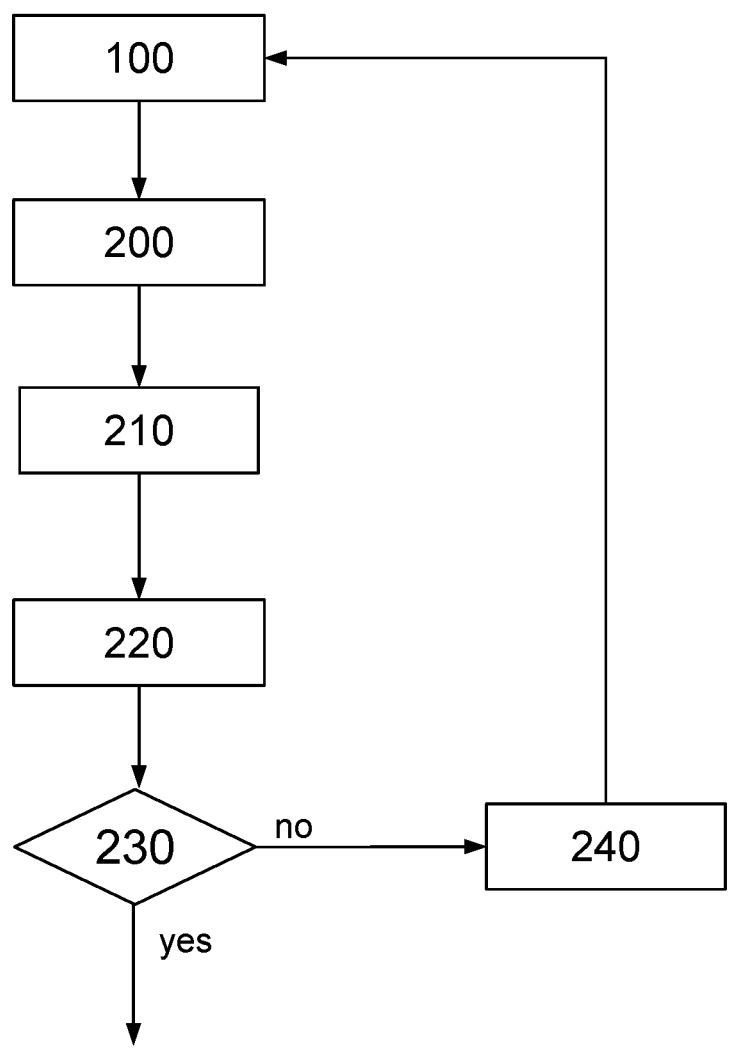
FIG. 2 an enhanced process for identifying a gene location candidate in an iterative manner.

Also, the described process can be included in an iterative approach of determining the gene location for a particular trait. FIG. 2 shows the selection of an individual organism (see process as shown in FIG. 1) as a first step 100.

Thereafter, the selected individual organism as well as another individual organism—potentially selected by the same selection process (step 100)—are crossed in step 200 (crossing of two selected individuals). Thereafter, breeding takes place (step 210). During or at the end of the breeding, the phenotypic trait can be measured (step 220) and further evaluated (step 230). Depending on the evaluation of the phenotypic trait, in step 230 the process can be continued or aborted with a final evaluation of a genetic location. If the individual does not show the required phenotypic trait, the respective information can be used to update the knowledge base RefDB (step 240). Thereafter, when the selection process (step 100) takes place, this process already uses the additional information generated in the previous cycle. Thereby, the candidate selection improves in quality over the time while maintaining a deterministic approach. In one embodiment, evaluation values EV for a particular candidate list, e.g., candidate list Can1, are determined by this iterative process.

Figure 9:
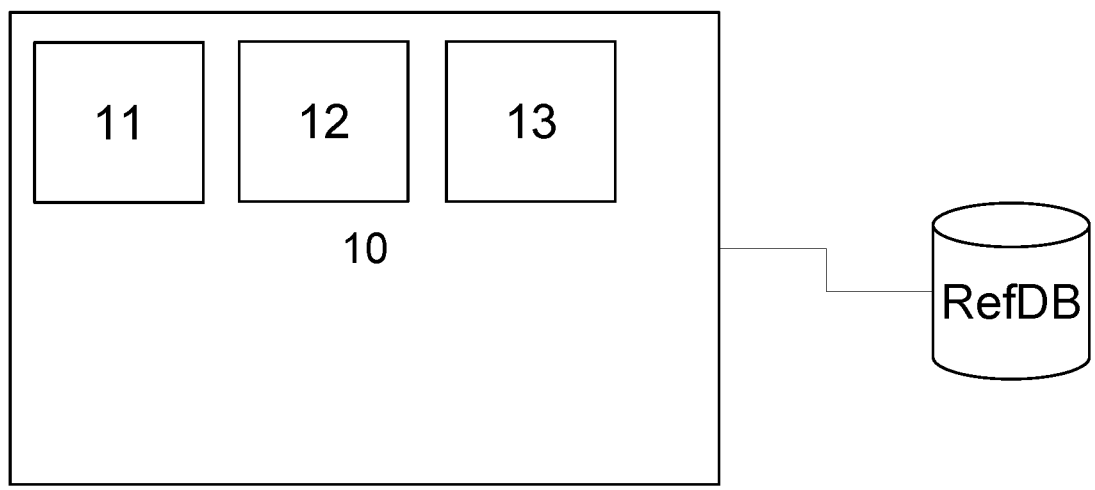
FIG. 9 a system for implementing the inventive method, e.g., in accordance with the process of FIG. 1.

FIG. 9 shows a system 10 for implementing the above captioned processes at least partially. System 10 comprises a memory 12 for storing instructions, which will implement the processes once being executed on a processor 11. An input/output device allows interaction with the real world, e.g., for receiving data input and/or performing measurements on the individuals. The knowledge base RegDB can be attached separately as a database server to the system 10. Alternatively, the knowledge base RegDB can be implemented as part of the system 10.

Any combination of one or more computer-readable medium(s) may be utilized to store instructions for at least partially perform the methods/processes as described above. The computer-readable medium may be a computer-readable signal medium or a computer-readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer-readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term compute-readable-storage medium also refers to various types of recording media capable of being accessed by the computer device via a network or communication link. For example, data may be retrieved over a modem, over the internet, or over a local area network. Computer executable code embodied on a computer-readable medium may be transmitted using any appropriate medium, including but not limited to wireless, wireline, optical fiber cable, RF, etc., or any suitable combination of the foregoing.

A computer-readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments, computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In view of the wide variety of permutations to the embodiments described herein, this detailed description is intended to be illustrative only, and should not be taken as limiting the scope of the invention. What is claimed as the invention, therefore, is all such modifications as may come within the scope of the following claims and equivalents thereto. Therefore, the specification and drawings are to be regarded in an illustrative rather than a restrictive sense.

In the above-described embodiments, the inventive method was used for identification a candidate closely linked to a trait. However, in accordance with the invention the method can also be used for the analysis of a feature selected from the group comprising:

identification of one or more traits,
    identification of one or more individuals or organism with one or more particular trait, and/or
    identifying individuals/organisms comprising such traits for use in a breeding and/or research projects.

In the above-described embodiments, in particular with reference to FIG. 2 the result of the evaluating of the phenotypic trait in step 230 if feedback to e.g., the knowledge base RefDB (step 240). In a preferred embodiment, any feedback from the evaluation step 230 will be fed back so that the knowledge database RefDB is enriched.

In at least some of the above described embodiments, reference was drawn to a gene location Loc within a DNA sequence. However, the invention is not limited to be used with gene locations Loc of DNA sequences. In one embodiment, candidate lists Can1, Can2, Can3 with candidates of RNA can be merged and/or particular RNA sequences can be selected for further processing. Again, the candidates of RNA can be ranked to identify RNA sequences, in particular mRNA sequences, indicative of a particular trail. E.g. a first candidate list Can1 might comprise three different sequences of RNA each sequence (=candidate) being assigned with an order, the order indicating a certain likely hood that the respective RNA sequence is relevant for a particular trait (e.g. the RNA sequence with the highest rank in the first candidate list Can1 can be considered as most relevant for the particular trait). A second candidate list Can2 might comprise at least partly different RNA sequences being ordered in the same manner as the first candidate list Can2. The algorithm as described with regards to FIG. 1 can be used to merge the RNA candidates into a single list containing some or all candidates mentioned in the original lists. The generated list can be used to select individual organisms. The process as described with reference to FIG. 2 can be applied. E.g, the selected individual organism as well as another individual organism—potentially selected by the same selection process (step 100)—are crossed in step 200 (crossing of two selected individuals). Thereafter, breeding takes place (step 210). During or at the end of the breeding, the phenotypic trait can be measured (step 220) and further evaluated (step 230).

As shown, the invention is not limited to gen locations of DNA but can be also applied to RNA candidates. Indeed, in yet another embodiment, the candidates in the candidate lists can be linked to quantitative values.

At this point, it should be pointed out that all parts of the above description are to be regarded individually, even without features additionally described in the respective context. This holds even if these features have not been explicitly identified individually as optional features in the respective context, e.g., by using in particular, preferably, for example, possibly, or other terms. Any of these described parts can be combined or sub-combined as independent embodiments of the invention or further developments. Deviations therefrom are possible.

Furthermore, it should be noted that the word "in particular" or round brackets, do not indicate any features that are mandatory in the respective context.

REFERENCE NUMERALS

Can1, Can2, Can3 candidate list
Can1', Can2' candidate list
PV, PV' performance value
RefDB Knowledge base
Loc Gene locations
EV Evaluation value
10 System
11 Processor
12 Memory
13 Input/output device
100 Selection of an individual
110 calculate performance values
120 calculating a normalized performance values
130 merging of lists
200 Crossing of at least two individuals
210 Breeding
220 Measuring phenotypic trait
230 Evaluating phenotypic trait
240 Updating RefDB

The invention claimed is:

1. A method for identifying at least one candidate (Loc), namely a gene location and/or a sequence variant, indicative for at least one selected (phenotypic) trait of an organism, in particular of a plant, comprising the steps of:
   a. receiving a plurality of candidate lists (Can1, Can2, Can3) of candidates (Loc), the candidate lists being ordered;
   b. receiving a reference set (RefDB) with gene locations and/or sequence variants;
   c. matching at least a subset of candidates (Loc) from the candidate lists (Can1, Can2, Can3) with the reference list (RefDB) to determine an evaluation value (EV) for at least the subset;
   d. assigning each evaluation value (EV) to the respective candidate (Loc) in the respective candidate lists (Can1, Can2, Can3);
   e. calculating, for each candidate list, a performance value based on the evaluation value (EV), in particular by using the evaluation values (EV), and calculating a (discounted) cumulative gain for each candidate list (Can1, Can2, Can3 taking into consideration the order of the candidate in the respective list and the evaluation value (EV) assigned to the respective candidate in the respective candidate list (Can1, Can2, Can3); and
   f. selecting at least one candidate (Loc) as (preferred) candidate (Loc) from one of the candidate lists (Can1, Can2, Can3) using the performance values.

2. The method according to claim 1, comprising the step of at least partially creating the reference set (RefDB) by:
   selecting data sets indicative of a plurality of individuals, wherein the plurality of individuals comprises individuals having the selected phenotypic trait and individuals not having the selected phenotypic trait;
   analyzing the plurality of individuals using a genomic analysis, a proteomic analysis, a transcriptomic analysis, and/or a cellomic analysis to obtain an analysis result, in particular at least partially sequencing the DNA and/or RNA of the plurality of selected individuals to obtain a DNA and/or RNA sequence; and
   correlating the analysis result, in particular the DNA and/or RNA sequence, to determine a candidate to be stored in the reference set (RefDB).

3. The method of claim 1, step e) comprising:
   generating an ordered evaluation list for each candidate list (Can1, Can2, Can3) by giving each evaluation value (EV) an order in the ordered evaluation list that correlates with the order of the candidate that the respective evaluation value (EV) is assigned to.

4. The method of claim 1, step e) comprising:
   calculating a (discounted) cumulative gain for each candidate list (Can1, Can2, Can3) based on the ordered evaluation list.

5. The method of claim 1, step f) comprising:
   calculating a normalized performance (120) value for each candidate list, in particular by using a softmax algorithm.

6. The method of claim 1, wherein the reference list (RefDB) assigns at least one category to each candidate in the reference list, the method comprising the steps of:
   determining a numerical value for each category; and
   using the numerical value to determine the evaluation values.

7. The method of claim 1, comprising the step of assigning a null value or a negative value as evaluation value to candidates which are not contained in the reference list (RefDB).

8. The method of claim 1, comprising
   measuring aggregated effects in an organism; and
   updating or adding entries in the reference list based on the measured aggregated effect, the entries comprising an indication of a gene location and/or sequence variant as well as an evaluation value (EV).

9. A method for identifying an individual comprising the steps of:
   a. identifying a candidate indicative for at least one phenotypic trait of an organism in accordance with the method of claim 1;
   b. determining based on the selected candidate a target sequence variant and/or gene location which is likely to be associated with the (phenotypic) trait; and
   c. identifying an individual comprising said sequence variant.

10. The method of claim 9, wherein the identification of the individual comprises a genomic analysis, a proteomic analysis, a transcriptomic analysis, and/or a cellomic analysis of a plurality of individuals of the organism.

11. The method of claim 10, wherein the identification of the individual comprises sequencing the DNA and/or RNA of a plurality of individuals of the organism and comparing the target sequence variant with the sequence variant of the individuals; and/or
   wherein determining the target sequence variant comprises:
   obtaining a plurality of individuals showing the selected (phenotypic) trait;
   sequencing the DNA and/or RNA of the plurality of individuals to obtain genetic information; and
   using the genetic information of the plurality of individuals to determine the target sequence variant.

12. A non-transitory computer-readable medium having stored therein instructions executable by a computing device to cause the computing device to perform the functions of:
   receiving a plurality of candidate lists (Can1, Can2, Can3) of candidates (Loc), the candidate lists being ordered;
   receiving a reference set (RefDB) with gene locations and/or sequence variants;
   matching at least a subset of candidates (Loc) from the candidate lists (Can1, Can2, Can3) with the reference list (RefDB) to determine an evaluation value (EV) for at least the subset;
   assigning each evaluation value (EV) to the respective candidate (Loc) in the respective candidate lists (Can1, Can2, Can3);
   calculating for each candidate list a performance value based on the evaluation value (EV), in particular by using the evaluation values (EV), and calculating a (discounted) cumulative gain for each candidate list (Can1, Can2, Can3) taking into consideration the order of the candidate in the respective list and the evaluation value (EV) assigned to the respective candidate in the respective candidate list (Can1, Can2, Can3); and
   selecting at least one candidate (Loc) as (preferred) candidate (Loc) from one of the candidate lists (Can1, Can2, Can3) using the performance values.

13. A method for modifying at least one phenotypic trait of an organism, in particular of a plant, comprising the steps of:
   a. selecting a first and a second individual in accordance with the method of claim 9; and
   b. crossing the first and the second individual to create the organism with the phenotypic trait.

14. A method for modifying at least one phenotypic trait of an organism, in particular of a plant, comprising the steps of:
   a. selecting a first and a second individual in accordance with the method of claim 10; and
   b. crossing the first and the second individual to create the organism with the phenotypic trait.

* * * * *